(12) United States Patent
Adamczyk et al.

(10) Patent No.: US 10,455,767 B2
(45) Date of Patent: Oct. 29, 2019

(54) CHOPPER KNIFE WITH HARDENING COATING

(75) Inventors: Dariusz Adamczyk, Plock (PL); Stanislaw Kudla, Plock (PL)

(73) Assignee: CNH Industrial America LLC, New Holland, PA (US)

( * ) Notice: Subject to any disclaimer, the term of this patent is extended or adjusted under 35 U.S.C. 154(b) by 577 days.

(21) Appl. No.: 14/113,606

(22) PCT Filed: Mar. 27, 2012

(86) PCT No.: PCT/EP2012/055410
§ 371 (c)(1),
(2), (4) Date: Oct. 24, 2013

(87) PCT Pub. No.: WO2012/146452
PCT Pub. Date: Nov. 1, 2012

(65) Prior Publication Data
US 2014/0045562 A1 Feb. 13, 2014

(30) Foreign Application Priority Data

Apr. 26, 2011 (BE) .................................. 2011/0241

(51) Int. Cl.
*A01F 12/40* (2006.01)
*A01F 29/02* (2006.01)

(52) U.S. Cl.
CPC .............. *A01F 12/40* (2013.01); *A01F 29/02* (2013.01)

(58) Field of Classification Search
CPC ...... B23D 35/001; A01D 34/736; C23C 16/18
USPC ..... 460/112, 111, 70, 901; 56/500, 503–505, 56/60
See application file for complete search history.

(56) References Cited

U.S. PATENT DOCUMENTS

| 2,335,249 | A | | 11/1943 | Hawkins | |
| 4,945,640 | A | * | 8/1990 | Garg et al. ...................... | 30/350 |
| 5,501,635 | A | | 3/1996 | Niermann | |
| 5,617,636 | A | * | 4/1997 | Taggett et al. .................. | 30/276 |
| 6,067,784 | A | * | 5/2000 | Jordan ........................... | 56/102 |
| 2005/0250427 | A1 | | 11/2005 | Freyvogel | |
| 2006/0213342 | A1 | | 9/2006 | Turner et al. | |

FOREIGN PATENT DOCUMENTS

| DE | 202006017540 | 2/2007 |
| EP | 829198 | 3/1998 |

* cited by examiner

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

A chopper knife for an agricultural machine has a plate-shaped blade having a front region and a rear region. The blade is confined in transversal direction by longitudinal edges. The front region comprises at least one elongate cutting edge provided with a coating extending along a surface of the blade over a width perpendicular to a longitudinal edge. The width of the coating decreases in a direction from the front region towards the rear region of the blade.

20 Claims, 3 Drawing Sheets

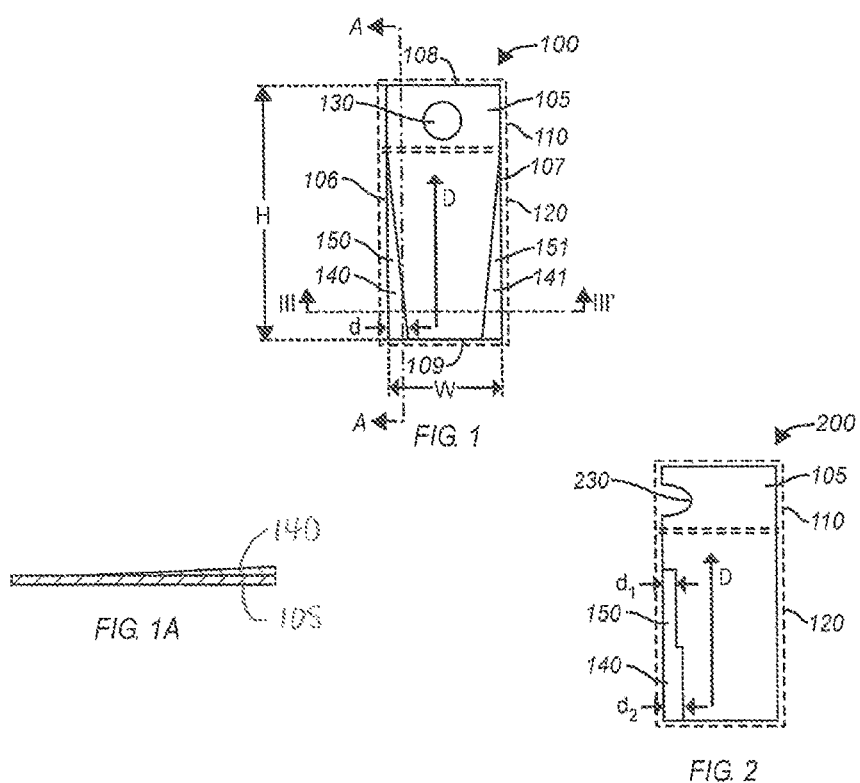

CHOPPER KNIFE WITH HARDENING COATING

This application is the US National Stage filing of International Application Serial No. PCT/EP2012/055410 filed on Mar. 27, 2012 which claims priority to Belgian Application BE2011/0241 filed Apr. 26, 2011, each of which is incorporated herein by reference in its entirety.

FIELD OF THE INVENTION

The invention relates to the field of agricultural harvesting. More specifically it relates to chopper knives for combine harvesters, e.g. for corn headers.

BACKGROUND OF THE INVENTION

Combine harvesters are agricultural machines that harvest cereal grain crops, such as wheat, oats, rye, barley, corn, soybeans and flax. Grain and straw are separated in a combine harvester, e.g. by performing the operations of reaping, threshing and winnowing in a single operational process. In a conventional combine harvester, a header cuts the crops and feeds them to a threshing drum, onto which rasp bars are affixed. Following the separation process, waste straw is supplied to a chopper for shredding the straw. The shredded straw may then be ejected downstream the chopper, e.g. it may be spread out over the field. The fundamental integration of a chopper into the material flow of a combine harvester is for example described in U.S. Pat. No. 5,501,635.

The materials supplied to the chopper can be a type of normal dry straw, for example wheat, barley, rye or oats straw. Likewise, corn, sunflowers and/or other plants can also be shredded. In known straw choppers, several chopper knives are arranged on a rotor, whose longitudinal axis is oriented transverse to the direction of travel and lies in a substantially horizontal plane. The chopper furthermore comprises counter-knives, which are non-rotating, for example fixed, with respect to the rotor. The chopper knives are led past the counter-knives at a predefined distance thereof, such that the straw can be cut up between chopper knives and counter-knives.

During operation of the chopper knives, the cutting edges wear out, which may lead to a deterioration of the chopper operation, a changed flow of the straw, reduced flow velocities and, at worst, a blockage of the chopper.

Different variations of chopper knives are known in the art. For instance, a chopper knife can have two opposite cutting edges. This has the advantage that the knife can be inverted in case of wearing-out of a cutting edge oriented in the direction of rotation, thereby roughly doubling its lifespan.

To reduce the wear, the cutting edges of the chopper knives may be hardened. In one example this may be performed by coating them for example with a tungsten carbide or chromium carbide coating. In another example, hard metal plates, e.g. metal carbide plates, may be soldered to the cutting edge of the chopper knives. Both application of a hard layer by coating or by soldering significantly increases the price of the chopper knives, in particular because of the price of the material to be applied.

DE 20 2006 017 540 U1 discloses a coating for chopper knives wherein the thickness of the coating is varied along the direction of the cutting edge. By increasing the coating thickness towards the end of the knife where the edge is expected to wear out faster, the life-expectancy of the chopper knife may be increased. However, application of a coating with variable thickness involves complex and costly manufacturing methods. Furthermore, still more expensive coating material is required.

SUMMARY OF THE INVENTION

It is an object of embodiments of the present invention to provide a good chopper knife for an agricultural machine.

The above objective is accomplished by a method and device according to the present invention.

In a first aspect, the present invention relates to a chopper knife for an agricultural machine. The chopper knife comprises a plate-shaped blade having a front region and a rear region, in which the rear region is adapted for securing the blade to a blade support. The front region comprises at least one elongate cutting edge. The blade is confined in transversal direction by longitudinal edges. The at least one elongate cutting edge is provided with a coating extending along a surface of the blade over a width perpendicular to a longitudinal edge. The width of the coating decreases in a direction from the front region towards the rear region of the blade.

It is an advantage of embodiments of the present invention that the provision of the coating with a decreasing width reduces the required amount of coating material. This may induce a cost reduction.

In embodiments of the present invention, the width of the coating may decrease continuously and monotonously in the direction from the front region to the rear region of the blade. Such coating with continuously and monotonously decreasing width is easy to apply.

In embodiments of the present invention, the front region may comprise a transversal front edge and the rear region may comprise a transversal back edge. The width of the coating may decrease from a first predetermined width at the transversal front edge to a second predetermined width at a predetermined location between the transversal front edge and the transversal back edge. This predetermined location may be dependent on the application on the agricultural machine, e.g. for some applications the cutting edge of the blade may be required to be larger than for other applications.

In embodiments of the present invention, the second predetermined width at a predetermined location between the transversal front edge and the transversal back edge may equal zero. In this case, in particular if the blade shape is for example substantially rectangular, the coating may have a triangular shape. In alternative embodiments of the present invention, the second predetermined width at a predetermined location between the transversal front edge and the transversal back edge may be different from zero.

In other embodiments of the present invention, the width of the coating may decrease stepwise in the direction from the front region to the rear region of the blade. In such embodiments, the blade may have a transversal front edge at the front region and a transversal back edge at the rear region, wherein the coating may comprise at least two parts, such that the at least two parts may be adjacent in the direction of the at least one cutting edge of the blade. In embodiments of the present invention, the width of each part may be substantially constant, e.g. with a width difference between the widest and the smallest width of a part not larger than 10%, e.g. not larger than 5%, and the width of a part closer to the transversal back edge of the blade may be smaller than the width of a part closer to the transversal front edge. The coating then has a staircase-like shape, at least at one side thereof. In yet alternative embodiments, the width of each part may be monotonously and continuously decreasing. In such embodiments, the width of a part may be defined as the average width of that part. Also in these embodiments, the width of a part closer to the transversal back edge of the blade may be smaller than the width of a part closer to the transversal front edge. The coating then has a staircase-like shape, at least at one side thereof. This embodiment in fact makes a combination of a continuously and monotonously decreasing width of the coating in the direction from the front region to the rear region of the blade, and a stepwise decreasing width of the coating.

In embodiments of the present invention, the coating may be a hardening coating. It is an advantage of embodiments of the present invention that the hardening coating provided on the at least one cutting edge increases the lifetime of the blade. In embodiments of the present invention, the coating may be made from tungsten carbide or chromium carbide.

In embodiments of the present invention, the coating may have a decreasing thickness in a direction from the front region towards the rear region of the blade. Decreasing the thickness of the coating reduces the amount of coating material required, which may provide a severe cost reduction in view of the high cost of the coating materials used. By having a thicker coating at the transversal front edge than towards the rear region of the blade, it is present in its optimal quantity at these locations where it is most needed, i.e. where the blade without coating would undergo the fastest wearing.

In a second aspect, the invention further relates to a method for manufacturing a chopper knife. The method comprises providing a plate-shaped blade having a front region and a rear region, in which the rear region is adapted for securing the blade to a blade support and the front region comprises at least one elongate cutting edge, the blade being confined in transversal direction by longitudinal edges. The method further comprises applying a coating onto the at least one cutting edge of the blade such that the coating extends along a surface of the blade over a width perpendicular to a longitudinal edge. Applying a coating onto the at least one cutting edge in accordance with embodiments of the present invention is such that the width of the coating decreases in a direction from the front region towards the rear region of the blade.

In accordance with embodiments of the present invention, applying a coating may be performed by means of vapor deposition, whereby the deposition of the coating onto the blade may be restricted by a mask for obtaining a predetermined width profile, e.g. a continuously and monotonously decreasing width profile and/or a stepwise decreasing width profile.

In embodiments of the present invention, applying a coating may be performed by means of spraying, for example thermal spraying. Here again the deposition of the coating onto the blade may be restricted, for example by a mask for obtaining a predetermined width profile, e.g. a continuously and monotonously decreasing width profile and/or a stepwise decreasing width profile.

It is an advantage of embodiments of the present invention that a chopper knife with limited wear-out may be provided.

It is an advantage of embodiments of the present invention that a chopper knife may be provided with good price-quality ratio.

It is an advantage of embodiments of the present invention that a chopper knife may be provided that is easy and cost-efficient to manufacture.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1 illustrates a chopper knife according to one embodiment of the present invention.

FIG. 1A illustrates a cross-sectional view the chopper knife of FIG. 1 taken along lines A-A in accordance with another aspect of the present invention.

FIG. 2 illustrates a chopper knife according to a second embodiment of the present invention.

Figure 3A:
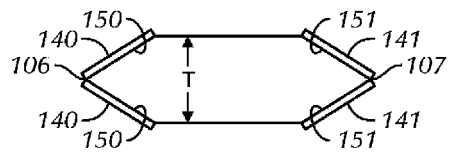
FIG. 3A, FIG. 3B and FIG. 3C illustrate cross-sectional shapes of the chopper knife of FIG. 1, with different locations of a hardening coating in accordance with embodiments of the present invention.

The drawings are only schematic and are non-limiting. In the drawings, the size of some of the elements may be exaggerated and not drawn on scale for illustrative purposes.

In the different drawings, the same reference signs refer to the same or analogous elements. Any reference signs in the claims shall not be construed as limiting the scope.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under, front and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect, the present invention relates to a chopper knife for an agricultural machine, particularly for use in a chopper component of an agricultural harvester. Such a chopper may be a fixed component of a harvester, or may constitute a removable part, e.g. a part of a corn header attachment for a combine harvester. By way of illustration, embodiments of the present invention not being limited thereto, an exemplary chopper knife 100 according to the first aspect of the present invention is shown in FIG. 1 and will be described in more detail below.

The chopper knife 100 comprises a plate-shaped blade 105 having a front region 120 and a rear region 110. The chopper knife 100 may for example be made of a thin plate of metal, such as steel, e.g. tempered steel, for example a chromium-vanadium alloy, e.g. 58 CrV4 or 50 CrV4, a carbon alloy, e.g. SAE J403, or for example a boron alloy, e.g. 10B38.

For example, the blade 105 may be of substantially rectangular shape, as illustrated in FIG. 1 and FIG. 2. The blade 105 may for example have a width W between 40 and 60 mm, for example 50 mm, a height H between 170 and 210 mm, for example 200 mm and a thickness T between 3 and 8 mm, for example 6 mm. The blade 105 may be bordered by longitudinal edges 106, 107 and by transversal edges 108, 109.

Figure 7:
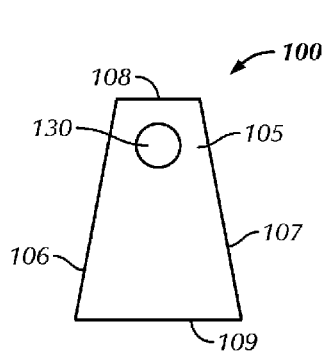
FIG. 7 to FIG. 9 illustrate blade shapes of chopper knives according to embodiments of the present invention.
Figure 8:
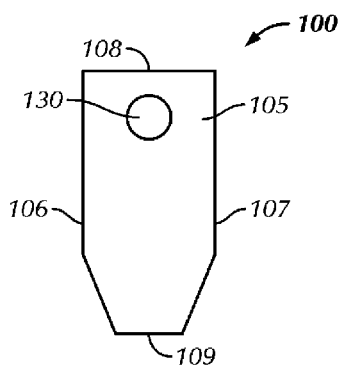

Alternatively, the blade 105 may be of polygonal shape. For example, the blade 105 may be of quadrilateral shape, e.g. an isosceles trapezoid, for example with one transversal edge 108 shorter than the other transversal edge 109 as illustrated in FIG. 7. The blade 105 may also be of hexagonal shape, for example as illustrated in FIG. 8.

The rear region 110 of the blade 105 may be adapted for securing the blade 105 to a blade support (not shown), e.g. a blade support in a chopper component of a harvester. Multiple chopper knives may for example be arranged on a substantially horizontal or horizontal bar such that the knives are pivotable. Alternatively, multiple chopper knives may be secured in the chopper component such that they remain stationary with respect to the chopper component, e.g. to work as counter-knives.

Figure 9:
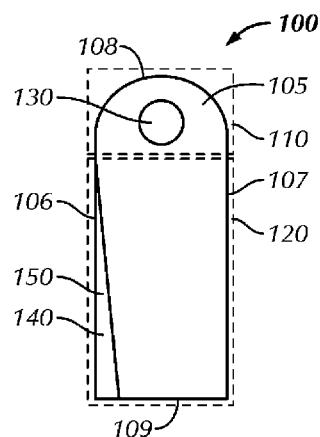

For example, a hole 130, e.g. a drilled hole, with a predetermined diameter, for example a diameter of 18 to 20 mm, may be provided in the rear region 110 of the blade to allow the blade 105 to be fastened, e.g. with a screw, to the blade support. Alternatively, the blade may for example be fastened by means of a slot, such as the slot 230 of the chopper knife 200 shown in FIG. 2, which may fit in a matching retaining element of the blade support. Also, the rear region 110 of the blade 105 may be rounded-off, e.g. the transversal edge 108 of the rear region 110 and the longitudinal edges 106, 107 may form a smooth curve, such as illustrated in FIG. 9. Hence, the blade 105 may have a shape based on a polygonal shape as disclosed above, but with the transversal edge 108 being rounded rather than straight (compare e.g. FIG. 9 to FIG. 1). Such rounded shape at the transversal edge remote from the cutting side may be applied to any suitable blade shape.

The front region 120 comprises at least one elongate cutting edge, for example two cutting edges 150 and 151. The at least one elongate cutting edge is formed along a longitudinal edge 106, 107 of the blade 105. In the embodiment illustrated in FIG. 1, two cutting edges 150, 151 are provided, one at each longitudinal edge 106, 107. In embodiments of the present invention, if there is more than one cutting edge 150, 151, this plurality of cutting edges may be provided at a same surface of the front region 120 of the blade 105. In alternative embodiments, the plurality of cutting edges 150, 151 may be provided at opposed surfaces of the front region 120 of the blade 105.

Figure 3B:
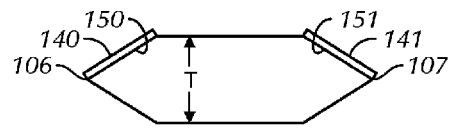
Figure 3C:
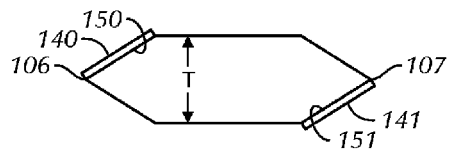

FIG. 3A, FIG. 3B and FIG. 3C illustrate a cross-sectional view of embodiments of the blade 105 of FIG. 1. The blade 105 illustrated in cross-section has a hexagonal shape. Moreover, the hexagonal shape is symmetrical. This, however, is not intended to be limiting to the present invention.

Figure 4:
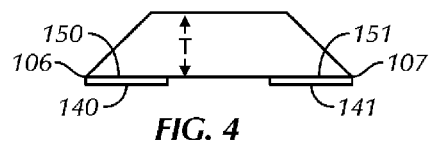
FIG. 4 to FIG. 6 illustrate alternative cross-sectional shapes of chopper knives according to embodiments of the present invention.
Figure 5:
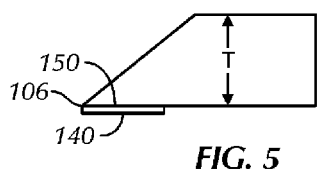
Figure 6:
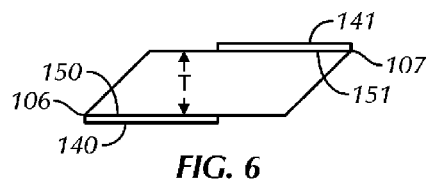
Figure 11:
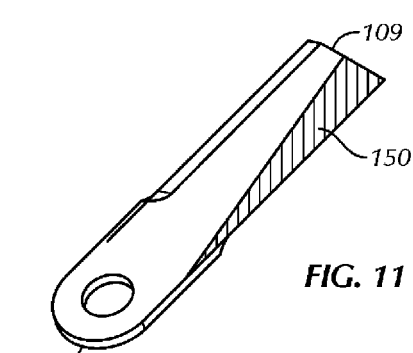
FIG. 10 and FIG. 11 illustrate a schematic top view and a schematic 3D view of a chopper knife as in FIG. 1, but with a rounded rear region.
Figure 10:
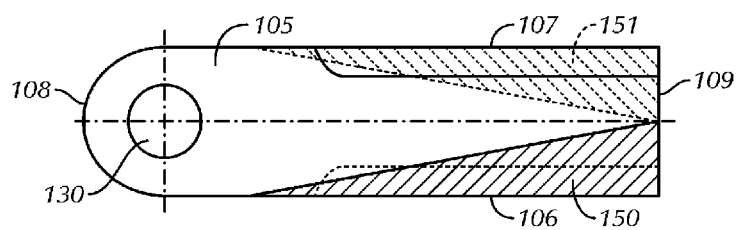

The blade 105 could have, in cross-section at the level of the at least one cutting edge 150, 151, a trapezoidal shape, as illustrated in FIG. 4. Yet alternatively, the blade 105 could have, in cross-section at the level of the at least one cutting edge, a polygonal shape, for example as in FIG. 5. The blade 105 could have, for example, in cross-section at the level of the at least one cutting edge, a quadrilateral shape with two pairs of parallel sides, such as illustrated in FIG. 6. FIG. 10 and FIG. 11 illustrate a blade 105, in top view and in 3D view respectively, which in cross-section has a shape as in FIG. 6, with cutting edges 150, 151 and hardening coatings 140, 141 at opposed sides of the blade 105.

Said at least one elongate cutting edge 150, 151 is provided with a coating 140, 141 for hardening the cutting edge 150, 151. The coating 140, 141 extends from the longitudinal edge 106, 107 over a width d, the width d being defined perpendicular to the longitudinal edge along a surface of the blade 105. It is particular to embodiments of the present invention that said width d of the coating 104, 141 decreases in the direction D from the transversal edge 109 at the front region 120 towards the transversal edge 108 at the rear region 110 of the blade 105. Said coating 140, 141 may for example be applied to both surfaces of the blade 105, as illustrated in FIG. 3A or may be applied to a single surface as illustrated in FIG. 3B and FIG. 3C. If a plurality of cutting edges 150, 151 are provided, the coatings 140, 141 thereof may be applied at a same surface of the blade, as for example in FIG. 3B and in FIG. 4, or at opposed surfaces of the blade 105, as for example in FIG. 3C and in FIG. 6.

Said coating may for instance be a tungsten carbide coating or a chrome based carbide coating. The coating may be of substantially uniform thickness, for example more than 0.10 mm thickness, e.g. 0.15 mm, or more than 0.15 mm thickness, e.g. 0.20 mm or 0.25 mm, or more than 0.25 mm thickness, e.g. 0.30 mm, or more than 0.30 mm thickness, e.g. 0.8 mm. In alternative embodiments, the thickness of the coating may decrease from the transversal front edge 109 towards the transversal back edge 108 (FIG. 1A). Such decrease of thickness may be continuous, or may decrease in discrete steps, e.g. the coating may comprise a plurality of subsequent regions such that the coating in each region is of substantially uniform thickness and the thickness of the coating of a region closer to the transversal back edge 108 of the blade is smaller than the thickness of the coating of a region closer to the transversal front edge 109.

In applications where the chopping knife 100 is attached to a chopper component of an agricultural harvester, for example such that the knife is allowed to pivot or rotate around a bar, the front region 120 will generally endure stronger forces than the rear region 110. Therefore providing a wider coated area nearer to the front, e.g. near transversal edge 109, helps to improve the longevity of a chopping knife according to embodiments of the present invention.

In embodiments of the present invention, for example in the exemplary chopper knife 100, the width d of the coating 140, 141, may decrease continuously and monotonously in the direction from the front region 120 to the rear region 110 of the blade, as indicated by arrow D in FIG. 1. For example, the width d may decrease linearly from a predetermined width at the front end of the blade, to end in a width equal to zero at a predetermined point, on the at least one cutting edge 106, 107, between the transversal front edge 109 and the transversal back edge 108 of the blade 105. In this example, the coating 140, 141, would exhibit a substantially triangular profile.

In other embodiments of the present invention, the width of the coating may decrease stepwise in the direction D from the transversal front edge 109 at the front region 120 towards the transversal back edge 108 at the rear region 110 of the blade 105. For example, in the chopper knife 200, illustrated in FIG. 2, the coating 140 may consist of two parts, such that the two parts are adjacent in the direction D of the at least one cutting edge 150 of the blade 105, the width of each part, d1 and d2, being substantially constant, and the width d1 of the part closest to the rear region 110 of the blade 105 being smaller than the width d2 of the other part. Also more than two parts with different widths may form a coating with decreasing width. The parts may have, but do not have to have, a same length in longitudinal direction of the blade 105. The decrease in width of the coating may be combined with a decrease in thickness as indicated above.

In a second aspect, the invention relates to a method for manufacturing a chopper knife according to embodiments of the present invention. A method according to embodiments of the present invention comprises the deposition of a hardening coating 140, 141, onto at least one cutting edge 150, 151 of a blade 105, such that the coating 140, 141 has a decreasing width in a longitudinal direction of the blade 105. The blade 105 has a front region 120 and a rear region 110 in longitudinal direction. The front region 120 comprises at least one cutting edge 150, 151, and the rear region 110 comprises a hole 130 to allow the blade 105 to be fastened to a blade support. The coating 140, 141 is applied to the at least one cutting edge 150, 151 such that it has a decreasing width in the longitudinal direction from the front region 120 to the rear region 110, which is the direction as indicated by arrow D in FIG. 1 and FIG. 2.

The hardening coating may be formed of chromium carbide or tungsten carbide. The hardening coating may be applied by means of deposition, such as for example vapor deposition. Such vapor deposition methods can for example be chemical vapor deposition, or physical vapor deposition, such as sputtering deposition. For example, a tungsten target cathode, e.g. a cylindrical target, may be used for sputtering in a low-pressure environment, e.g. $10'$ mbar, with e.g. an $Ar/CH_4$ sputtering gas mixture. In this example the blade substrate would for example be heated to 350° C., and the deposition of the coating onto the blade substrate would furthermore be restricted by a mask for obtaining a predetermined width (d) profile, for instance a substantially triangular shape such as illustrated in FIG. 1.

The hardening coating may also for example be applied by means of spray coating such as for example thermal spraying, e.g. flame spraying or plasma spraying. For example, the coating material to be deposited may be introduced in a plasma jet emanating from a plasma torch. In this jet the material would be melted and propelled towards the blade substrate. The molten droplets would then solidify and form a deposit adhering to the blade substrate, and the deposition of the coating onto the blade substrate would furthermore be restricted by a mask for obtaining a predetermined width (d) profile, for instance a substantially triangular shape such as illustrated in FIG. 1.

The invention claimed is:

1. A chopper knife for an agricultural machine, the chopper knife comprising a plate-shaped blade having a front region and a rear region, in which the rear region is adapted for securing the blade to a blade support, the front region comprising at least one elongate cutting edge, the blade confined in transversal direction by longitudinal edges, the blade being provided with a coating extending across a surface of the blade,
   wherein a width and a thickness of the coating decreases in a direction from the front region towards the rear region of the blade.

2. A chopper knife according to claim 1, wherein the width of the coating decreases continuously in the direction from the front region to the rear region of the blade.

3. A chopper knife according to claim 2, the front region comprising a transversal front edge and the rear region comprising a transversal back edge, wherein the width of the coating decreases from a first predetermined width at the transversal front edge to a second predetermined width at a predetermined location between the transversal front edge and the transversal back edge.

4. A chopper knife according to claim 3, wherein the second predetermined width at a predetermined location between the transversal front edge and the transversal back edge equals zero.

5. A chopper knife according to claim 3, wherein the second predetermined width at a predetermined location between the transversal front edge and the transversal back edge is greater than zero.

6. A chopper knife according to claim 1, wherein the width of the coating decreases stepwise in the direction from the front region to the rear region of the blade.

7. A chopper knife according to claim 6, the blade having a transversal front edge at the front region and a transversal back edge at the rear region, wherein the coating comprises at least two parts, such that the at least two parts are adjacent in the direction of the at least one cutting edge of the blade, the width of a part closer to the transversal back edge of the blade smaller than the width of a part closer to the transversal front edge.

8. A chopper knife according to claim 1, wherein the coating is a hardening coating.

9. A chopper knife according to claim 8, wherein the coating is made from tungsten carbide or chromium carbide.

10. A chopper knife according to claim 1, wherein the coating extends across an entire width of the blade perpendicular to a longitudinal edge.

11. A method for manufacturing a chopper knife, comprising the steps of
providing a plate-shaped blade having a front region and a rear region, in which the rear region is adapted for securing the blade to a blade support, the front region comprising at least one elongate cutting edge, the blade confined in transversal direction by longitudinal edges, and
applying a coating onto the blade such that the coating extends across an entire surface of the cutting edge, wherein a width and a thickness of the coating decreases in a direction from the front region towards the rear region of the blade.

12. A method according to claim 11, wherein applying the coating is performed by vapor deposition, the deposition of the coating onto the blade being restricted by a mask for obtaining a predetermined width profile.

13. A method according to claim 11, wherein applying the coating is performed by thermal spraying, the deposition of the coating onto the blade restricted by a mask for obtaining a predetermined width profile.

14. A chopper knife for an agricultural machine, the chopper knife comprising:
a plate-shaped blade confined in transversal direction by longitudinal edges, the plate-shaped blade including:
a front region having at least one elongate cutting edge,
a rear region adapted for securing the plate-shaped blade to a blade support, and
a coating extending across a surface of the plate-shaped blade, wherein the coating has a thickness and a width that decreases in a direction from the front region towards the rear region of the blade.

15. The chopper knife according to claim 14, wherein the front region comprises a transversal front edge and the rear region comprises a transversal back edge, and wherein the thickness of the coating decreases from a first predetermined thickness at the transversal front edge to a second predetermined thickness at a predetermined location between the transversal front edge and the transversal back edge.

16. The chopper knife according to claim 15, wherein the second predetermined thickness at the predetermined location between the transversal front edge and the transversal back edge equals zero.

17. The chopper knife according to claim 15, wherein the second predetermined thickness at the predetermined location between the transversal front edge and the transversal back edge is greater than zero.

18. The chopper knife according to claim 14, wherein the thickness of the coating decreases stepwise in the direction from the front region to the rear region of the plate-shaped blade.

19. The chopper knife according to claim 18, wherein the plate-shaped blade includes a transversal front edge at the front region and a transversal back edge at the rear region, and wherein the coating comprises at least two parts adjacent in a direction of the at least one elongate cutting edge, wherein a thickness of the coating closer to the transversal back edge is smaller than a thickness of coating closer to the transversal front edge.

20. The chopper knife according to claim 14, wherein the coating extends across an entire width of the plate-shaped blade perpendicular to the longitudinal edge.

* * * * *